(12) United States Patent
Matsui

(10) Patent No.: US 7,712,112 B2
(45) Date of Patent: May 4, 2010

(54) OPTICAL DISK DEVICE HAVING MOTOR WITH SPACER ASSEMBLY

(75) Inventor: Nobuki Matsui, Saitama (JP)

(73) Assignee: TEAC Corporation, Tama-shi (JP)

( * ) Notice: Subject to any disclaimer, the term of this patent is extended or adjusted under 35 U.S.C. 154(b) by 659 days.

(21) Appl. No.: 11/784,245

(22) Filed: Apr. 5, 2007

(65) Prior Publication Data

US 2007/0240177 A1    Oct. 11, 2007

(30) Foreign Application Priority Data

Apr. 6, 2006    (JP) .............................. 2006-105517

(51) Int. Cl.
*G11B 17/28*    (2006.01)
(52) U.S. Cl. ...................... 720/697; 720/700
(58) Field of Classification Search ................ 720/697, 720/696, 652, 677, 689, 691, 700, 663; 360/99.09, 360/99.11; 369/270.1, 208
See application file for complete search history.

(56) References Cited

U.S. PATENT DOCUMENTS

2005/0055706 A1*   3/2005   Omori et al. ................ 720/700

FOREIGN PATENT DOCUMENTS

JP    2000-331442 A    11/2000

\* cited by examiner

*Primary Examiner*—Craig A. Renner
*Assistant Examiner*—Tamara Ashford
(74) *Attorney, Agent, or Firm*—Christensen O'Connor Johnson Kindness PLLC

(57) ABSTRACT

An optical disk drive includes a spindle motor for rotating an optical disk, and an optical pickup head. On a base plate, a pickup moving motor moves the optical pickup head in a disk radial direction. A motor plate supports the spindle motor. A spacer holder has a small thickness, and is secured to the base plate. A spacer boss is disposed to project from the spacer holder toward the motor plate. A first hole is formed through the spacer boss. A retaining screw has first and second shaft portions. A screw hole is formed in the base plate, for engagement with the first shaft portion inserted through the first hole, to retain the retaining screw. A great diameter peripheral surface is positioned at the second shaft portion, for applying pressure to fit the spacer boss tightly on the motor plate. Further, the spacer is formed from plastic material.

9 Claims, 8 Drawing Sheets

OPTICAL DISK DEVICE HAVING MOTOR WITH SPACER ASSEMBLY

BACKGROUND OF THE INVENTION

1. Field of the Invention

The present invention relates to an optical disk device having a motor. More particularly, the present invention relates to an optical disk device having a motor, and of which an optical pickup can be positioned exactly in relation to a spindle associated with the motor.

2. Description Related to the Prior Art

An optical disk such as a CD-R and DVD is an optical information recording medium widely used in a personal computer or other electronic equipment. An optical disk drive or player as optical disk device is incorporated in electronic equipment, for example a portable type referred to as a notebook type of computer, and is used to drive the optical disk. The optical disk drive includes a disk rotating mechanism, and an optical pickup head. The disk rotating mechanism rotates the optical disk at a high speed on a disk tray. The optical pickup head moves in a radial direction of the optical disk, and records information thereto by application of a laser beam. Also, the optical pickup head reads information by receiving laser beam reflected by the optical disk.

A carriage is a pickup moving mechanism, and has the optical pickup head supported thereon. There is a base plate, on which rail shafts are secured to keep the carriage movable in a radial direction of the optical disk. A motor plate is connected with the base plate. On the motor plate, a spindle motor is disposed for rotating the optical disk. A first hole is formed in the motor plate. A screw hole is formed in the base plate. A spacer having a spacer boss is disposed between the motor plate and the base plate. An insertion hole is formed in the spacer boss. The spacer boss is inserted in the first hole of the motor plate, before a screw is helically engaged with the screw hole through the first hole and the insertion hole, to fasten the motor plate and the base plate with the spacer in the squeezed state.

Recently, information recording density of the optical disk has become higher and higher. Thus, high precision is desired in positioning of the optical pickup head and the spindle motor. It is essentially important to keep precision high in assembling the motor plate with the base plate. Precision of the sizes of the base plate, the motor plate and the spacers themselves is also important.

JP-A 2000-331442 discloses a guide shaft securing mechanism for a disk drive, including a support and a guide post portion. The support supports a guide shaft for moving the optical pickup head in the disk radial direction. The guide post portion receives the motor plate for the spindle motor. The support is kept in contact with the guide post portion for positioning the support.

In JP-A 2000-331442, a guide post shaft of the guide post portion is inserted in a first hole of the motor plate. Then screws are fastened to secure the motor plate on the guide post portion. However, sufficient clearance is required between the guide post shaft and the first hole in order to insert the guide post shaft of the guide post portion in the first hole of the motor plate. A problem arises in offsetting of the guide post portion relative to the motor plate, namely offsetting of the spindle motor relative to the optical pickup head, to the degree corresponding to the clearance. Failure in correct playback or recording of information occurs with the optical pickup head when the position of the spindle motor relative to the optical pickup head is incorrect.

SUMMARY OF THE INVENTION

In view of the foregoing problems, an object of the present invention is to provide an optical pickup can be positioned exactly in relation to a spindle associated with the motor.

In order to achieve the above and other objects and advantages of this invention, an optical disk device includes a spindle motor for rotating an optical disk, and an optical pickup head, movable in a radial direction of the optical disk, for reading from or writing to the optical disk. The optical disk device includes a base plate. A motor plate has a surface opposed to the base plate, for supporting the spindle motor secured to the surface. A spacer is secured to the base plate, for supporting the motor plate with a predetermined space. A spacer boss is disposed at an end of the spacer, and having a smaller diameter. A first hole is formed through the spacer boss. A second hole is formed in the motor plate, for receiving insertion of the spacer boss. A retaining hole is formed in the base plate. A retaining element is inserted in the first hole and the retaining hole, for retaining the motor plate to the base plate with the spacer. The retaining element includes a retaining portion, a spread portion and a pinhead portion formed sequentially on one another. The retaining portion is inserted through the first hole, and retained in the retaining hole. The spread portion has a greater diameter than a diameter of the first hole, is pressed through the first hole forcibly, for spreading the spacer boss outwards to fit a peripheral surface of the spacer boss tightly in the second hole. The pinhead portion has a greater diameter than a diameter of the second hole, for mounting on the motor plate.

The spread portion is shaped with an increasing diameter from a first end to a second end thereof, the first end being disposed nearer to the retaining portion, and having a smaller diameter than the diameter of the first hole.

The pickup moving mechanism includes at least one rail shaft, disposed to extend in the radial direction of the optical disk, having one end secured to the base plate, and another end secured to the spacer, to support the optical pickup head movably.

The spacer includes a spacer body or spacer holder, having a small thickness, secured to the base plate. A spacer tubular portion is disposed to project from the spacer holder toward the motor plate, has the spacer boss at one end thereof, for defining a space between the base plate and the motor plate.

The retaining shaft is a retaining screw, the retaining portion is a male thread portion, and the retaining hole has a female thread.

Furthermore, a spindle is disposed to project erectly from the base plate, driven by the spindle motor, for rotating the optical disk.

Furthermore, a cutout is formed in the spacer boss, for keeping the spacer boss bendable.

Each of the retaining hole, the second hole, the spacer boss and the retaining shaft is constituted by two retaining holes, two second holes, two spacer bosses or two retaining shafts.

The spindle motor has a motor peripheral surface, and the spacer is curved and extends by following the motor peripheral surface. Furthermore, an arc shaped recess is formed in the base plate, has an inner surface for extending by following the motor peripheral surface, and is so positioned that the spindle protrudes therein.

The spread portion is in such a predetermined size that the spacer boss contacts the motor plate when spread outwards by insertion of the spread portion in the first hole.

The spacer is formed from a plastic material.

The at least one rail shaft is constituted by first and second rail shafts for extending substantially in parallel with one another. The pickup moving mechanism includes a carriage for supporting the optical pickup head movably on the first and second rail shafts.

Also, an optical disk device is provided, including a spindle motor for rotating an optical disk, and an optical pickup head for reading from or writing to the optical disk. The optical disk device includes a base plate. A pickup moving mechanism moves the optical pickup head on the base plate in a radial direction of the optical disk. A motor plate supports the spindle motor. A spacer body or spacer holder has a small thickness, and is secured to the base plate. A spacer boss is disposed to project from the spacer holder toward the motor plate. A first hole is formed through the spacer boss. A retaining shaft has first and second shaft portions. A retaining hole is formed in the base plate, for engagement with the first shaft portion inserted through the first hole, to retain the retaining shaft. A fitting mechanism is positioned at the second shaft portion, for applying pressure to fit the spacer boss tightly on the motor plate.

The fitting mechanism includes a second hole, formed in the motor plate, for receiving insertion of the spacer boss. A great diameter peripheral surface is positioned on the second shaft portion, having a greater diameter than a diameter of the first hole, pressed through the first hole forcibly, for tightly closing inside the second hole by spreading the spacer boss.

Furthermore, a pinhead portion is formed at an end of the second shaft portion, and having a greater diameter than a diameter of the second hole.

The great diameter peripheral surface is shaped with an increasing diameter from a first end to a second end thereof, the first end being disposed nearer to the first shaft portion, and having a smaller diameter than the diameter of the first hole.

The pickup moving mechanism includes at least one rail shaft, disposed to extend in the radial direction of the optical disk, having one end secured to the base plate, and a second end secured to the spacer holder, to support the optical pickup head movably.

Furthermore, a spacer tubular portion is disposed to project from the spacer holder toward the motor plate, having the spacer boss at one end thereof, for defining a space between the base plate and the motor plate.

BRIEF DESCRIPTION OF THE DRAWINGS

The above objects and advantages of the present invention will become more apparent from the following detailed description when read in connection with the accompanying drawings, in which:

FIG. 5A is a perspective illustrating the spacer;

DETAILED DESCRIPTION OF THE PREFERRED EMBODIMENT(S) OF THE PRESENT INVENTION

Figure 1:
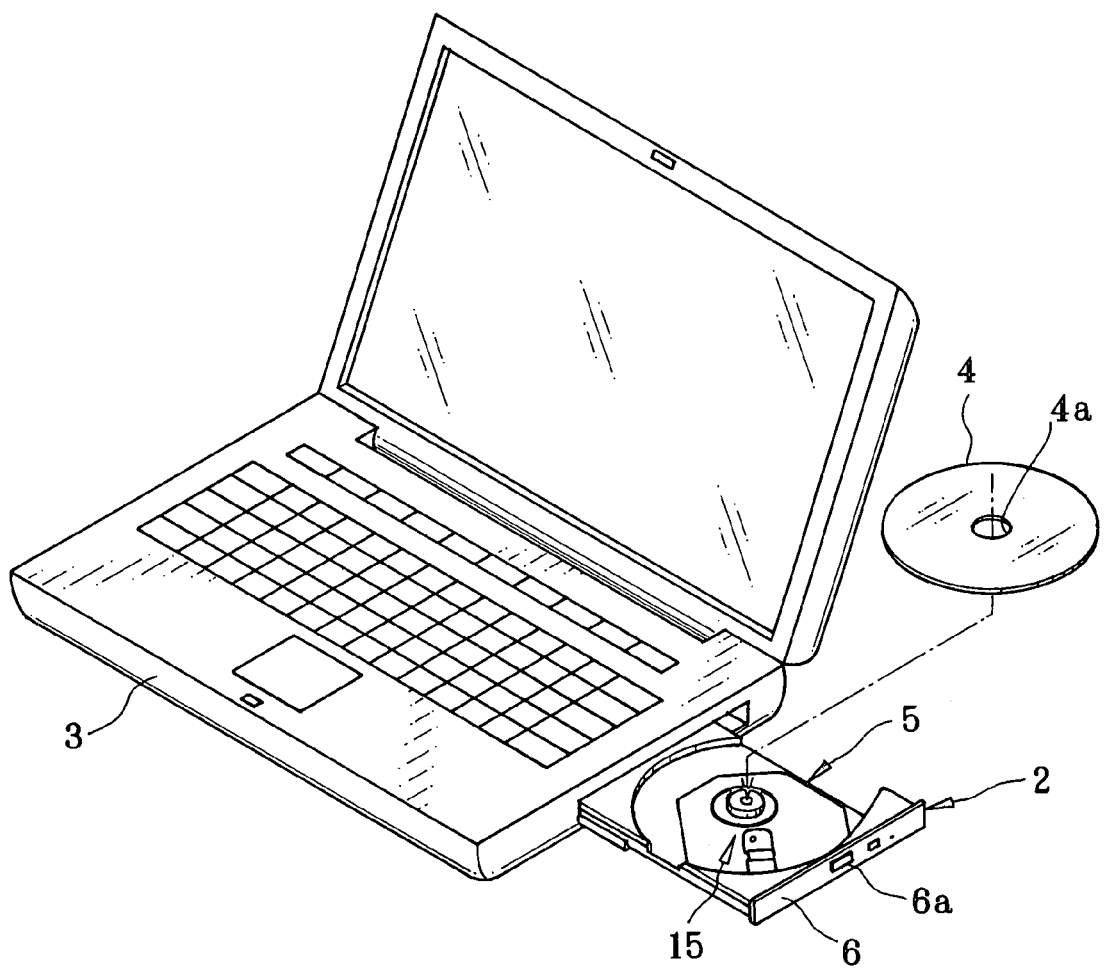
FIG. 1 is a perspective view illustrating a personal computer of a notebook type.

In FIG. 1, a personal computer of a notebook type is illustrated as a portable electronic instrument. An optical disk drive 2 or optical disk player as optical disk device is incorporated in the personal computer. A computer body 3 has one side wall in which the optical disk drive 2 is located. A disk tray unit 5 of the optical disk drive 2 is fully drawn out, so an optical disk 4 as optical information recording medium is ready to be placed. When the disk tray unit 5 is loaded with the optical disk 4, a front cover 6 is depressed. The disk tray unit 5 becomes inserted and locked in the computer body 3 in a loading position. An ejection button 6a is disposed in the front cover 6, and pushed when a user wishes to draw out the disk tray unit 5. There is an optical pickup head 21. When the front cover 6 is depressed, the disk tray unit 5 becomes unlocked except for the period of the access of the optical pickup head 21 to the optical disk 4. The disk tray unit 5 moves to protrude at a predetermined stroke, for example 10 mm, by a spring. The user is allowed to squeeze and pull the front cover 6 to the advance position indicated in the drawings.

Figure 2:
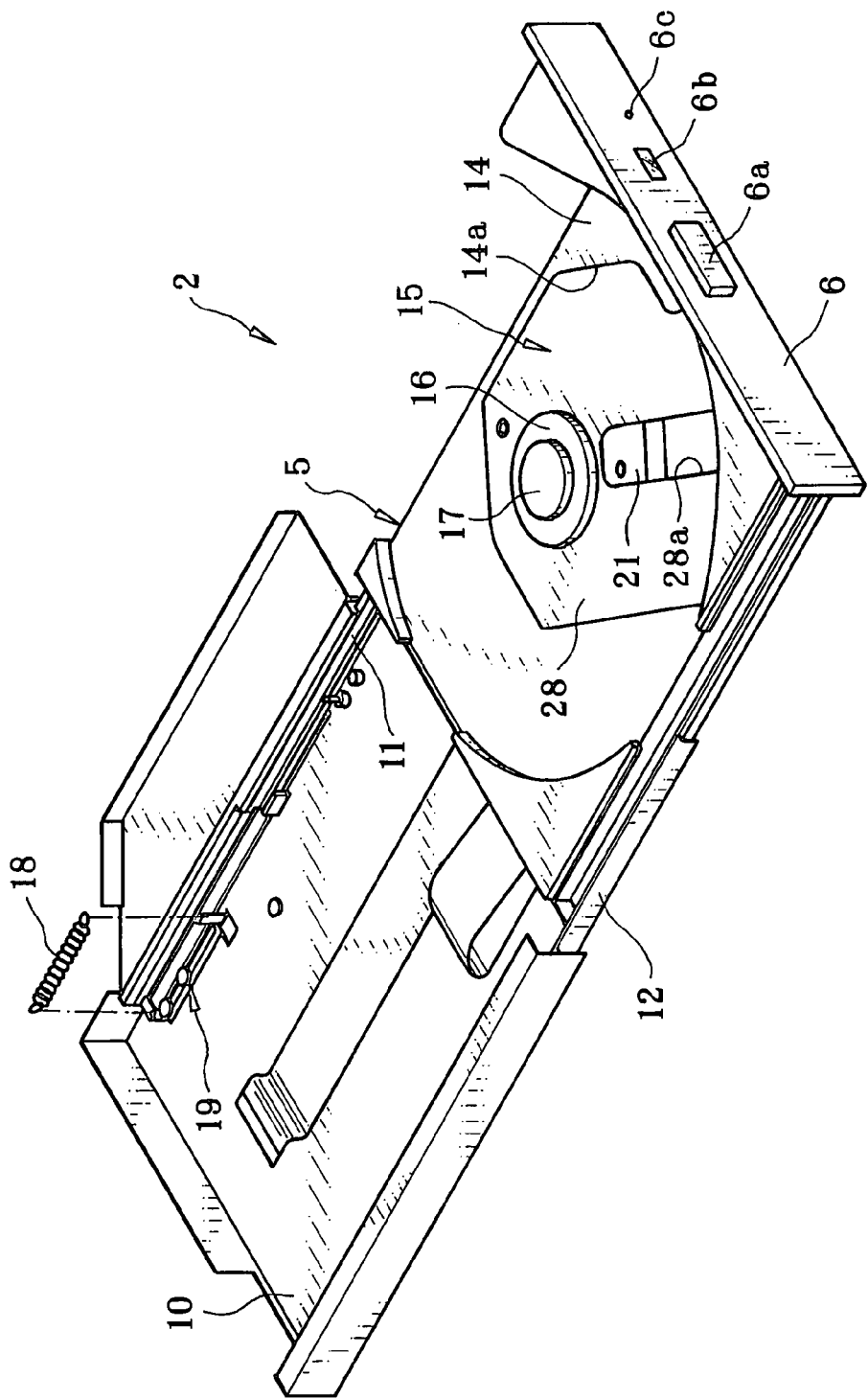
FIG. 2 is a perspective view illustrating an optical disk drive.

In FIG. 2, the optical disk drive 2 includes the disk tray unit 5, a frame 10 of metal, and slide rails 11 and 12. The frame 10 is fixed inside the computer body 3. The slide rails 11 and 12 slide on guide rails of side walls of the frame 10. The disk tray unit 5 is slidable on the slide rails 11 and 12. Guide rails of a plastic material are fixed on inner surfaces of the side walls of the frame 10 for guiding movement of the slide rails 11 and 12.

In FIG. 2, the disk tray unit 5 includes a plastic disk tray 14 and an optical pickup 15. The disk tray 14 is formed from a plastic material, and has a circular recess formed in association with an outer diameter of the optical disk 4. An aperture 14a is formed in the disk tray 14. The optical pickup 15 is combined to close the aperture 14a. Ridges and channels for guiding are formed in side walls of the disk tray 14, and extend in the sliding direction of the disk tray unit 5. The slide rails 11 and 12 are engaged with those. The disk tray 14 is kept slidable on the frame 10 by the slide rails 11 and 12 and the guide rails. The optical pickup 15 moves in the same direction upon sliding of the disk tray 14. Stoppers are suitably associated with the disk tray 14, the slide rails 11 and 12 and the guide rails, so the disk tray 14 and the slide rails 11 and 12 slide in predetermined ranges.

The optical pickup 15 includes a spindle motor 16 and a spindle 17 for chucking. An output shaft of the spindle motor 16 is connected with the spindle 17. The spindle 17 is driven by the spindle motor 16 to rotate the optical disk 4. In FIG. 1, a center hole 4a for chucking is formed in the optical disk 4. When the optical disk 4 is loaded in a recess of the disk tray 14, the spindle 17 is inserted in and engaged with the center hole 4a for supporting the optical disk 4.

An ejector 19 is disposed in an inner space of the frame 10. A compression coil spring 18 is included in the ejector 19. The disk tray unit 5, when unlocked in the loading position upon depression of the ejection button 6a, is moved by the compression coil spring 18 to protrude at a predetermined stroke. Note that an access indicator 6b externally indicates a state of the access to the optical disk 4. An auxiliary ejection hole 6c is formed for troubleshooting. It is likely that the ejection button 6a even depressed does not operate for ejection. However, a user can insert a hard wire with a small width into the auxiliary ejection hole 6c, so the disk tray 14 is mechanically unlocked in the loading position and enabled to move out.

When pressure is exerted to depress the disk tray 14 from the outer position of FIG. 2, the disk tray 14 slides inwards on the slide rails 11 and 12. Also, the slide rails 11 and 12 slide inwards on the guide rails that are stationary on the frame 10. When the disk tray 14 becomes shifted to a predetermined position in the frame 10, a hook (not shown) becomes engaged with the disk tray 14 in charging the compression coil spring 18. The disk tray 14 is locked mechanically in the loading position.

Figure 3:
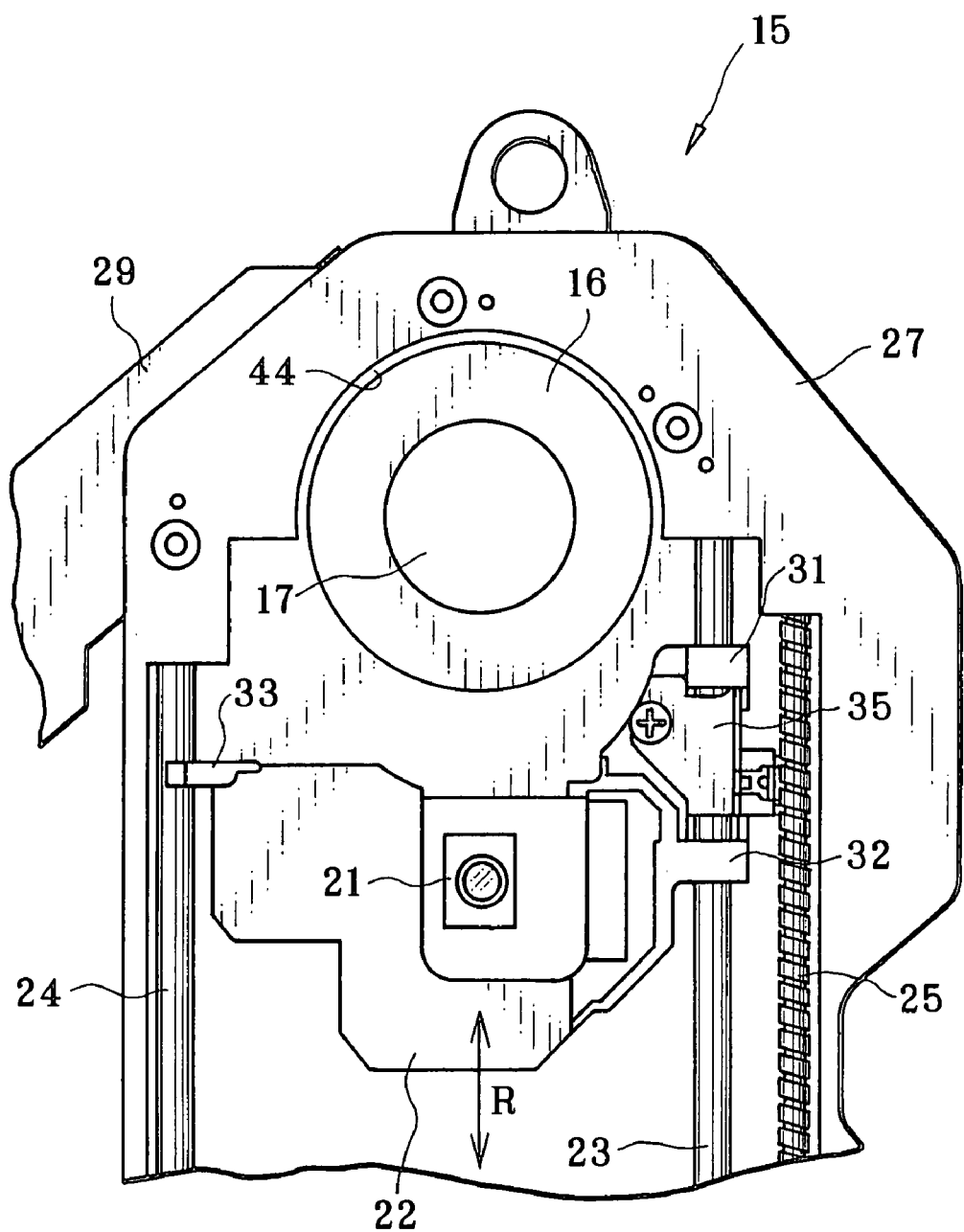
FIG. 3 is a plan, partially broken, illustrating an optical pickup.
Figure 4:
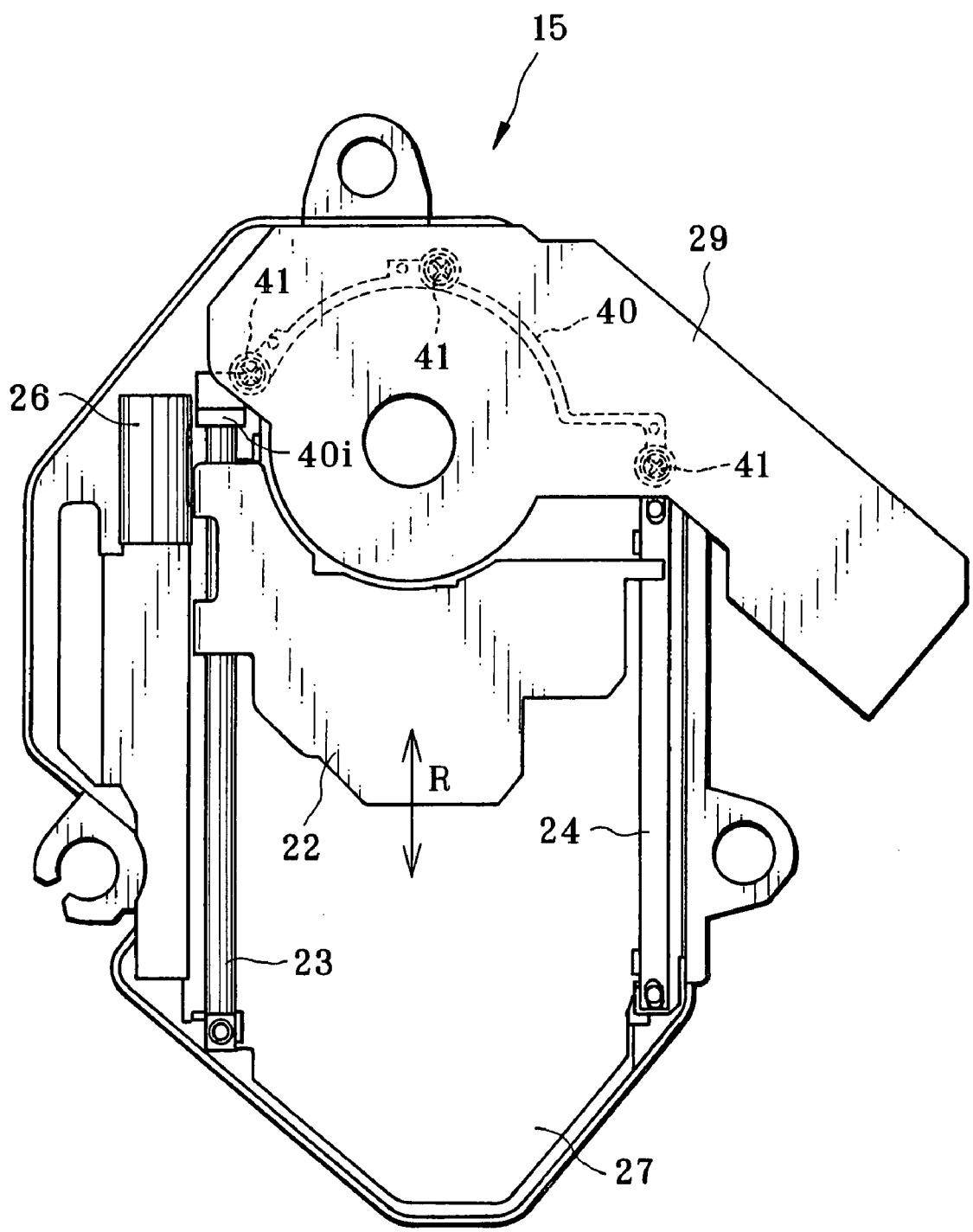
FIG. 4 is a bottom plan, partially broken, illustrating the optical pickup.

In FIGS. 3 and 4, a pickup moving mechanism for the optical pickup 15 has the spindle motor 16, and also a carriage 22, a first rail shaft 23, a second rail shaft 24, a lead screw 25 and a pickup moving motor 26. The carriage 22 supports the optical pickup head 21. The rail shafts 23 and 24 keep the carriage 22 movable in a radial direction of the optical disk 4. The lead screw 25 moves the carriage 22. The pickup moving motor 26 rotates the lead screw 25. An output shaft of the pickup moving motor 26 is connected with the lead screw 25.

In FIG. 3, there is a base plate 27 of metal. A first end of the first rail shaft 23, two ends of the second rail shaft 24 and the pickup moving motor 26 are secured to the base plate 27 by screws or the like. A spacer holder 40 with a small thickness is associated with the base plate 27. A shaft connector 40i is formed with the spacer holder 40. A second end of the first rail shaft 23 is secured to the shaft connector 40i.

In FIG. 2, a cover plate 28 of metal is fitted on an upper face of the base plate 27 for covering. A motor plate 29 of metal supports the spindle motor 16 fixed thereon. The motor plate 29 is disposed lower than the base plate 27 in the optical disk drive 2. The spindle motor 16 and a control circuit board (not shown) are secured to the motor plate 29. The control circuit board controls driving of the optical pickup head 21 and the pickup moving motor 26. Three dampers (not shown) of rubber are attached to the optical pickup 15 as elastic material for absorbing vibration and shock. In FIG. 3, the optical pickup 15 is viewed from the top. In FIG. 4, the optical pickup 15 is viewed from the bottom.

An opening 28a is formed in the cover plate 28, and extends straight from the spindle motor 16 radially. See FIG. 2. The optical pickup head 21 accesses the optical disk 4 by passing through the opening 28a.

First and second slidable rings 31 and 32 or channel shaped arms are formed with the carriage 22 for insertion of the first rail shaft 23. A hook 33 projects from the carriage 22 and is engageable with the second rail shaft 24. The first rail shaft 23 is inserted in the slidable rings 31 and 32. The hook 33 is engaged with the second rail shaft 24. Then the carriage 22 is kept slidable in the radial direction of the optical disk 4, or the longitudinal direction of the rail shafts 23 and 24 extending in the disk radial direction. A threaded connector 35 is disposed on the carriage 22 between the slidable rings 31 and 32 in connection with a screw. The threaded connector 35 has two thread teeth helically engaged with threads of the lead screw 25. When the pickup moving motor 26 is driven to rotate the lead screw 25, the carriage 22 is caused by the threaded connector 35 to move in the radial direction of the optical disk 4.

Figure 5:
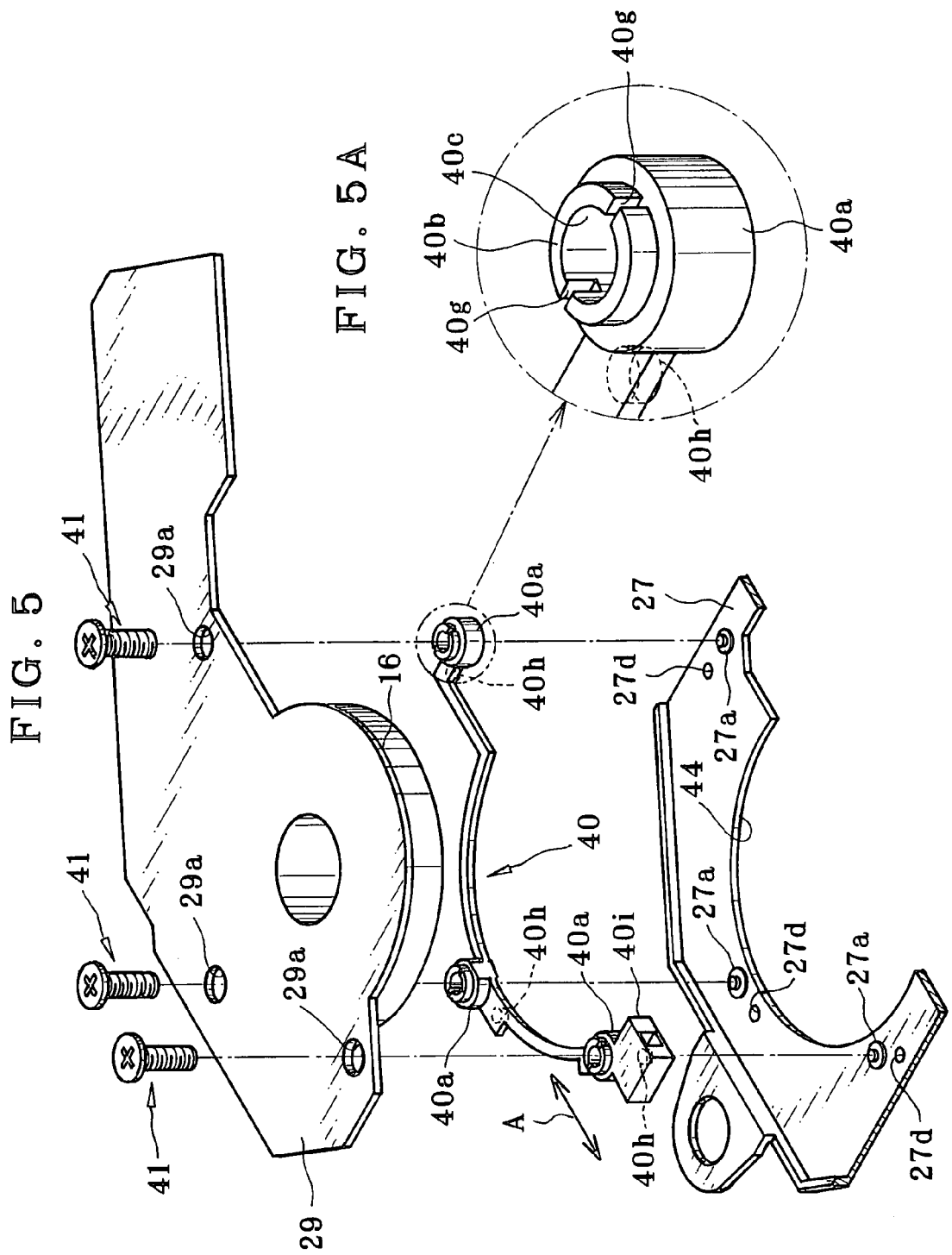
FIG. 5 is an exploded perspective illustrating a base plate, a motor plate and a spacer.
Figure 6:
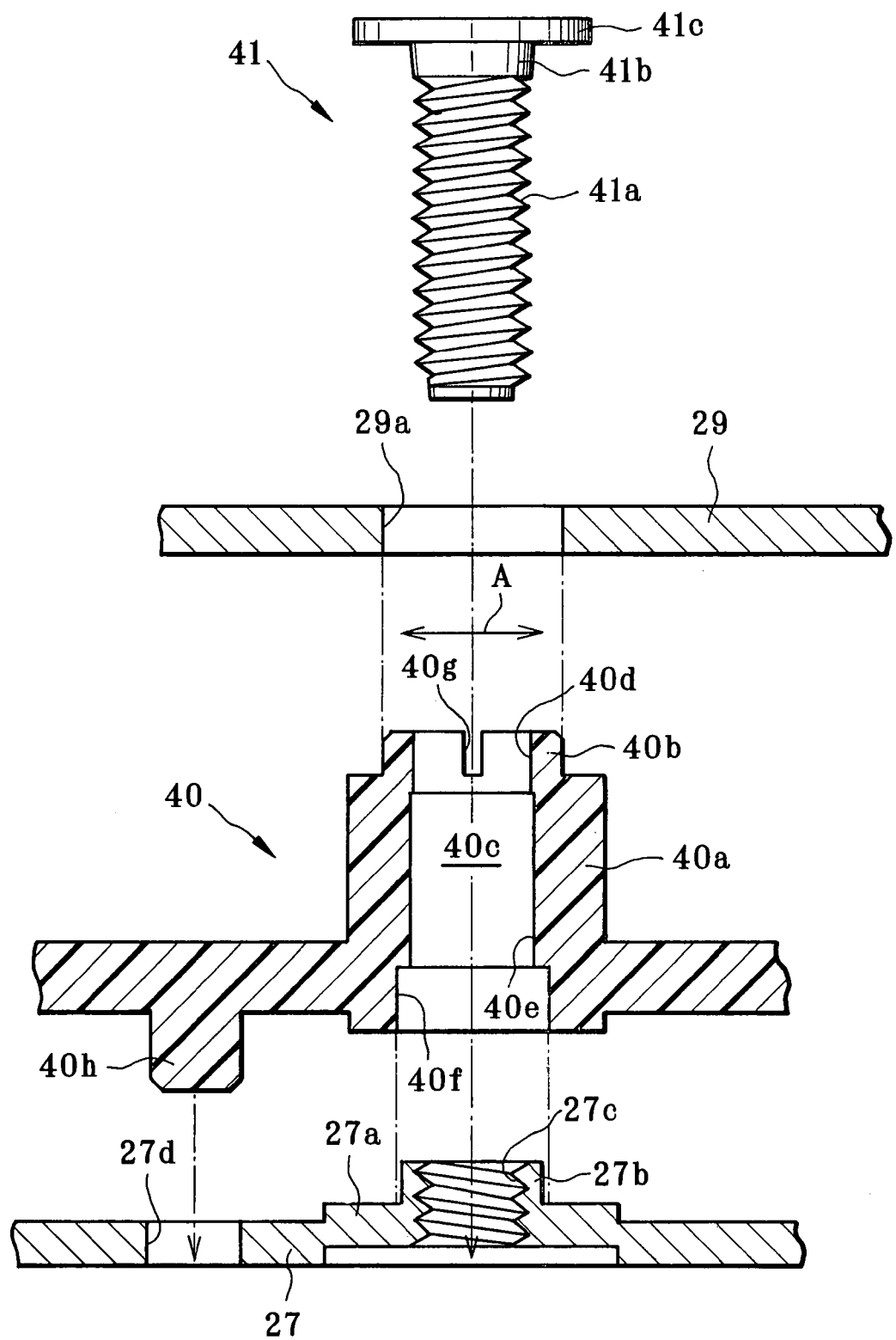
FIG. 6 is a cross section illustrating the base plate, the motor plate and the spacer.

In FIGS. 5, 5A and 6, the spacer holder 40 is disposed between the base plate 27 and the motor plate 29. In a sequence of assembly of the motor plate 29, at first the spacer holder 40 is placed on the base plate 27. Then the motor plate 29 is placed on the spacer holder 40. Retaining screws 41 as retaining elements are inserted through first holes 40c, and secured to the base plate 27 and the motor plate 29 for their connection together with the spacer holder 40 squeezed between.

Three receiving portions 27a are formed with the base plate 27, and receive the spacer holder 40. The spacer holder 40 has a third bush portion 40f disposed nearer to the base plate 27. A positioning projection 27b is formed on a surface of the receiving portions 27a, and inserted in the third bush portion 40f. A male thread of a first shaft portion or retaining portion 41a for retention is disposed at the end of the retaining screws 41. A female thread is defined in a screw hole 27c as retaining hole, which is formed in the base plate 27 through the receiving portions 27a and the positioning projection 27b. The retaining portion 41a is helically engaged with the screw hole 27c. Positioning bosses 40h protrude from the spacer holder 40. Positioning holes 27d are formed in the peripheral portion of the receiving portions 27a of the base plate 27, and receive insertion of the positioning bosses 40h.

Three second holes 29a for engagement with a fitting mechanism are formed in the motor plate 29 and associated with the screw hole 27c. Three engageable spacer bosses 40b are portions protruding from the spacer holder 40, and are inserted in respectively the second holes 29a. The diameter of the second holes 29a is greater than that of the spacer boss 40b.

An arc shaped recess 44 is formed in the base plate 27. An edge of the arc shaped recess 44 is so disposed that the spacer holder 40 extends along the edge, and a peripheral surface of the spindle motor 16 is opposed to the edge.

A preferable material for the spacer holder 40 is resin, for example polyphenylene sulfide (PPS), and polybutylene terephthalate (PBT) and the like. Three post-shaped tubular spacers or rods 40a are formed to project from the spacer holder 40 and positioned at respectively the screw hole 27c. The spacer boss 40b is formed with the tubular spacers 40a on a face nearer to the motor plate 29, for insertion in each of the second holes 29a. The first hole 40c for insertion is formed through each of the spacer bosses 40b for receiving insertion of the retaining portion 41a of the retaining screws 41 upon insertion in the tubular spacers 40a and the spacer bosses 40b. The first hole 40c has a stepped shape with three steps or bush portions. A first bush portion 40d is at an end of the first hole 40c where the spacer boss 40b lies. A second bush portion 40e is next to the first bush portion 40d. The third bush portion 40f is next to the second bush portion 40e.

The retaining screw 41 has a second shaft portion or spread portion 41b as a fitting mechanism with a great diameter peripheral surface. The first bush portion 40d has an inner diameter greater than a diameter of the retaining portion 41a of the retaining screws 41 and smaller than a diameter of the spread portion 41b. The second bush portion 40e has an inner diameter greater than a diameter of the retaining portion 41a. The third bush portion 40f has an inner diameter greater than the diameter of the retaining portion 41a and also that of the positioning projection 27b. Therefore, the positioning projection 27b is insertable in the third bush portion 40f.

Two slits or cutouts 40g are formed in the spacer boss 40b, and disposed at a pitch of 180 degrees. The cutouts 40g are so positioned that the spacer boss 40b spreads outwards in the direction A when the spread portion 41b of the retaining screws 41 enters the first bush portion 40d.

The positioning boss 40h is formed on the spacer holder 40, and insertable in the positioning hole 27d of the base plate 27. A diameter of the positioning boss 40h is slightly smaller than that of the positioning hole 27d. The shaft connector 40i is formed with the spacer holder 40, and secured to an end of the first rail shaft 23 in FIG. 3. A shaft insertion hole in the shaft connector 40*i* receives insertion of an end of the first rail shaft 23.

Each of the retaining screws 41 includes a pinhead portion 41*c* or screw head in addition to the retaining portion 41*a* and the spread portion 41*b*. The retaining portion 41*a* has the male threads for retention. The spread portion 41*b* extends from an end of the retaining portion 41*a* farther from the spacer holder 40. The pinhead portion 41*c* is formed at an end of the spread portion 41*b*. An end of the spread portion 41*b* nearer to the retaining portion 41*a* has a smaller diameter than an inner diameter of the first bush portion 40*d*. A diameter of the spread portion 41*b* increases toward its end nearer to the pinhead portion 41*c*. At the center of the spread portion 41*b*, its diameter is greater than the first bush portion 40*d*. Thus, the spread portion 41*b* can enter the first bush portion 40*d* despite the local increase in the diameter.

Figure 7A:
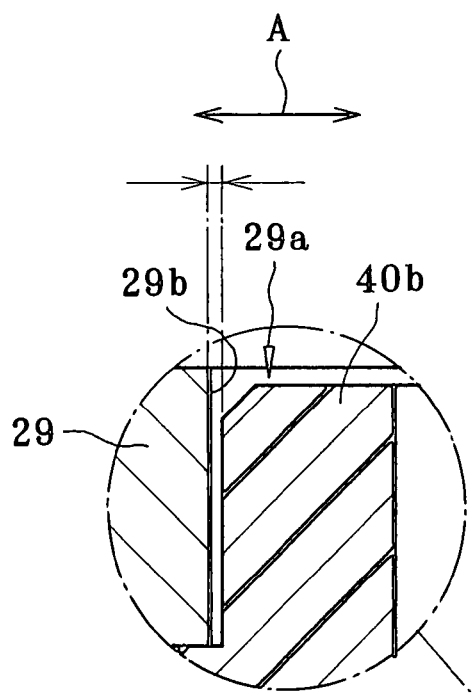
FIG. 7A is a cross section illustrating the engaged state in enlargement.
Figure 7:
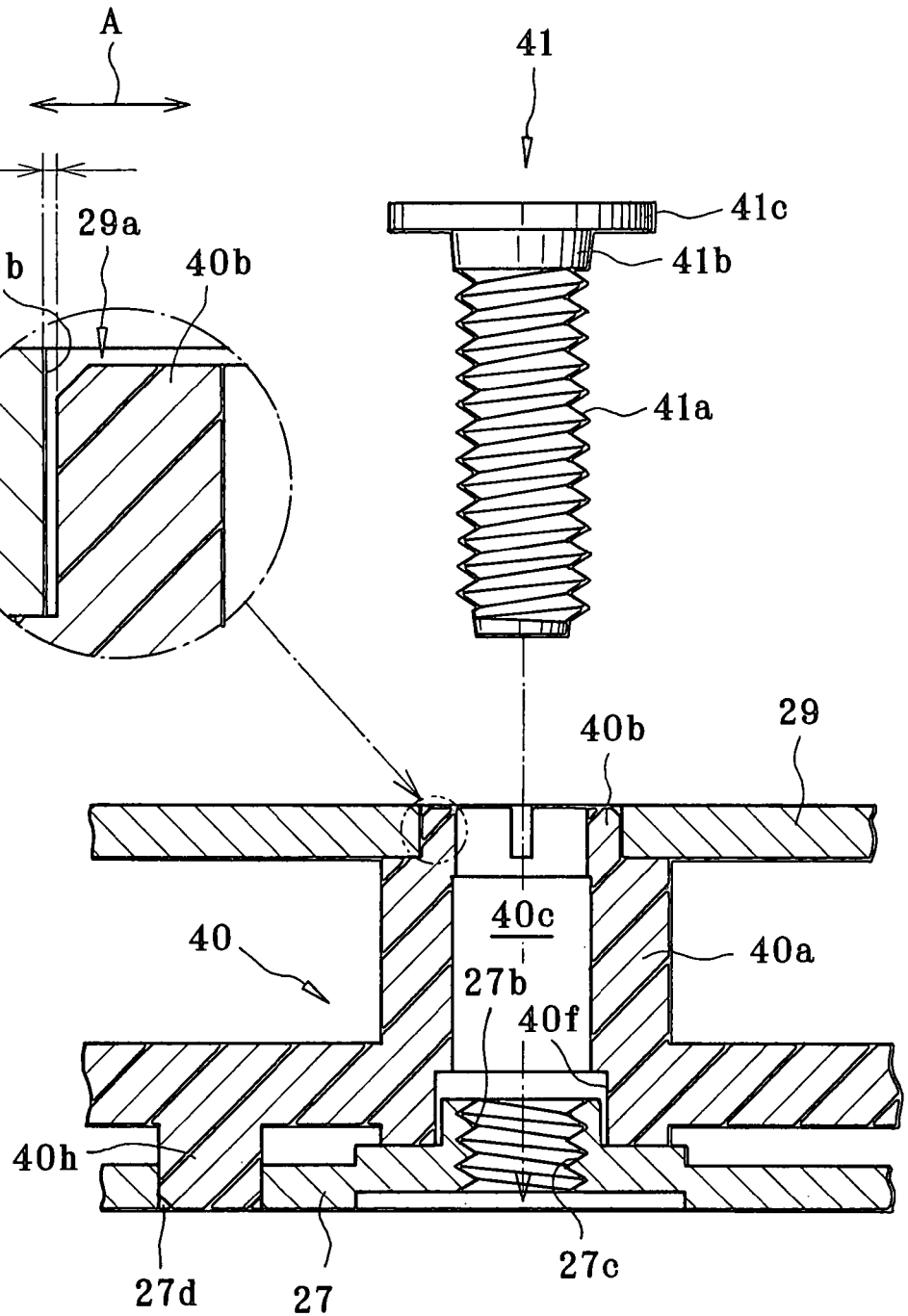
FIG. 7 is a cross section illustrating a state of the base plate, the motor plate and the spacer being engaged.

The operation of the optical disk drive 2 is described now by referring to FIG. 7. To combine the motor plate 29 with the base plate 27, at first the positioning boss 40*h* of the spacer holder 40 is inserted in the positioning hole 27*d* of the base plate 27. Also, the positioning projection 27*b* is inserted in the third bush portion 40*f*. The spacer boss 40*b* is inserted in each of the second holes 29*a* of the motor plate 29. There occurs a gap between the spacer boss 40*b* and a hole surface 29*b* of the second holes 29*a* of the motor plate 29, the gap being open in the direction A of FIG. 7A.

Figure 8A:
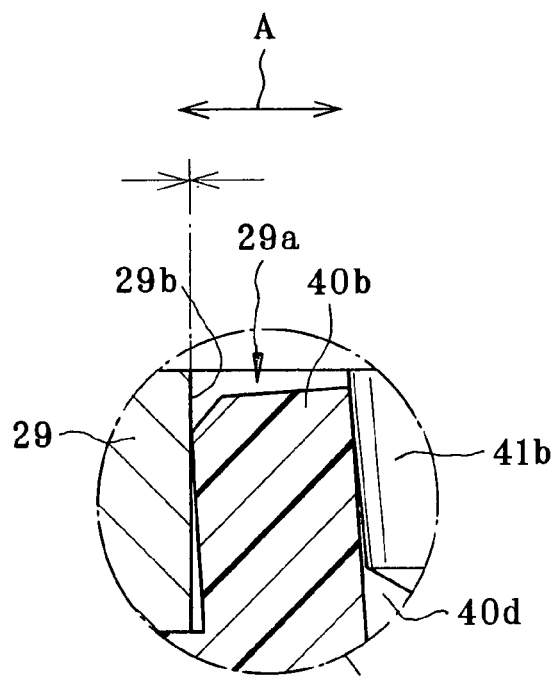
FIG. 8A is a cross section illustrating the squeezed state in enlargement.
Figure 8:
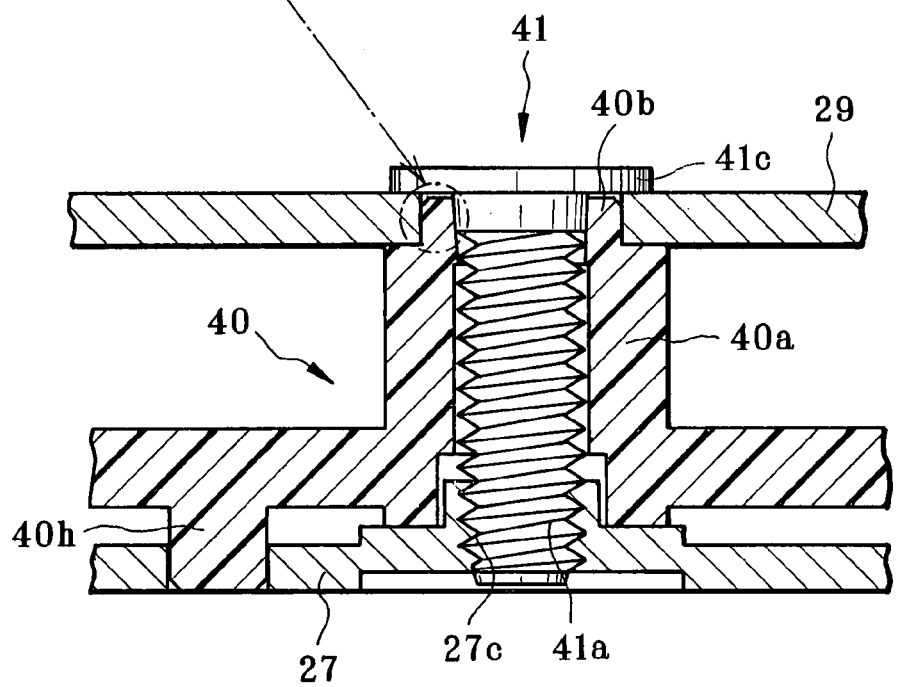
FIG. 8 is a cross section illustrating a squeezed state of the spacer between the base plate and the motor plate.

In FIG. 8, a screwdriver as a tool is used for the retaining screws 41. The retaining portion 41*a* of the retaining screws 41 is inserted in the first hole 40*c* and helically engaged with the screw hole 27*c*. The retaining screw 41 is positioned on the base plate 27. When the retaining screw 41 is rotated to cause the pinhead portion 41*c* to contact an outer face of the motor plate 29, the base plate 27 and the motor plate 29 are secured in a state of squeezing the spacer holder 40. The spread portion 41*b* enters the first bush portion 40*d* forcibly to position the spacer holder 40 in relation to the retaining screws 41 by pressure of the spread portion 41*b* to the inside of the first bush portion 40*d*. When the spread portion 41*b* enters the first bush portion 40*d*, the spacer boss 40*b* spreads laterally and contacts the hole surface 29*b*, so no gap remains between the spacer boss 40*b* and the hole surface 29*b* in the direction A in FIG. 8A. The motor plate 29 is positioned in relation to the spacer holder 40. The spacer holder 40 and the motor plate 29 are exactly positioned with the base plate 27 when the retaining portion 41*a* of the retaining screws 41 is inserted in the first hole 40*c* and helically engaged with the screw hole 27*c*.

Owing to the retaining screw 41 secured to the base plate 27 and the motor plate 29, the spacer boss 40*b* is spread by the spread portion 41*b* outwards to the right and left, and contacts the hole surface 29*b* of the motor plate 29. Thus, the motor plate 29 can be prevented from offsetting in the position of the base plate 27. The optical pickup head 21 and the spindle motor 16 can be kept positioned exactly.

The cutouts 40*g* are formed in the spacer boss 40*b*, so that spreading of the spacer boss 40*b* is facilitated. As the cutouts 40*g* are arranged in parallel with the moving direction of the optical pickup head 21 or the carriage 22, it is possible effectively to prevent offsetting between the motor plate 29 and the base plate 27 in the direction vertical to the moving direction of the optical pickup head 21. Thus, reproduction and record of data with the optical pickup head 21 can be correct. Furthermore, a position or direction of the cutouts 40*g* can be modified so as to alter a direction of spreading the spacer bosses 40*b*. It is possible to adjust prevention of offsetting of the base plate 27 and the motor plate 29 by conditioning the direction of spreading.

In the present embodiment, the cutouts 40*g* are two in each of the spacer bosses 40*b* on the spacer holder 40. However, the number of the cutouts 40*g* can be three or more. Also, the position of the cutouts 40*g* can be modified suitably.

In the above embodiment, the spacer bosses 40*b* are three on the spacer holder 40. However, the number of the tubular spacers 40*a* and the spacer bosses 40*b* can be two, or four or more. Also, the numbers of the screw hole 27*c* of the base plate 27 and the second holes 29*a* of the motor plate 29 can be determined equally for the spacer boss 40*b*.

In the above embodiment, the spacer holder 40 is formed from resin. However, materials suitable for deformation can be used for the spacer holder 40 to deform the spacer boss 40*b* with the retaining screw 41, for example, metal.

In the above embodiment, the optical pickup head 21 and the spindle 17 in the optical disk drive 2 are directed upwards. The optical disk 4 is placed higher than the optical pickup head 21, and is oriented horizontally. The motor plate 29 is disposed lower in the optical disk drive 2, the base plate 27 being disposed higher, in the manner upside down regarding the depiction of FIGS. 5-8. However, the optical disk drive 2 of the invention may be an upright type distinct from the above horizontally oriented type. In the upright type, the disk tray unit 5 and the optical disk 4 can be positioned to extend vertically.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An optical disk device, including a spindle motor for rotating an optical disk, and an optical pickup head, movable in a radial direction of said optical disk, for reading from or writing to said optical disk, said optical disk device comprising:

a base plate;

a motor plate, having a surface opposed to said base plate, for supporting said spindle motor secured to said surface;

a spacer, secured to said base plate, for supporting said motor plate with a predetermined space;

a spacer boss disposed at an end of said spacer, and having a smaller diameter;

a first hole formed through said spacer boss;

a second hole, formed in said motor plate, for receiving insertion of said spacer boss;

a retaining hole formed in said base plate;

a retaining element, inserted in said first hole and said retaining hole, for retaining said motor plate to said base plate with said spacer;

said retaining element including a retaining portion, a spread portion and a pinhead portion formed sequentially on one another;

said retaining portion being inserted through said first hole, and retained in said retaining hole;

said spread portion having a greater diameter than a diameter of said first hole, being pressed through said first hole forcibly, for spreading said spacer boss outwards to fit a peripheral surface of said spacer boss tightly in said second hole; and said pinhead portion having a greater diameter than a diameter of said second hole, for mounting on said motor plate.

2. An optical disk device as defined in claim 1, wherein said spread portion has a diameter increasing from said retaining portion toward said pinhead portion.

3. An optical disk device as defined in claim 1, further comprising a pickup moving mechanism including at least one rail shaft, disposed to extend in said radial direction of said optical disk, having one end secured to said base plate, and another end secured to said spacer, to support said optical pickup head movably.

4. An optical disk device as defined in claim 2, wherein said spacer includes:
   a spacer holder secured to said base plate; and
   a spacer tubular portion, formed on said spacer holder, having said spacer boss, for defining said space.

5. An optical disk device as defined in claim 4, wherein said retaining element is a retaining screw, said retaining portion is a male thread portion, and said retaining hole has a female thread.

6. An optical disk device as defined in claim 1, further comprising a cutout, formed in said spacer boss, for facilitating external spreading of said spacer boss.

7. An optical disk device as defined in claim 4, wherein said spacer is formed from a plastic material.

8. An optical disk device as defined in claim 7, comprising at least two retaining holes, second holes, spacer bosses, and retaining elements.

9. An optical disk device as defined in claim 4, wherein said spacer holder is in an arc shape extending by following a motor peripheral surface of said spindle motor; and
   said base plate includes an arc shaped recess for extending by following said motor peripheral surface.

* * * * *